United States Patent Office 2,863,752
Patented Dec. 9, 1958

2,863,752
HERBICIDES

Philip C. Hamm, Webster Groves, and Angelo J. Speziale, Kirkwood, Mo., assignors to Monsanto Chemical Company, St. Louis, Mo., a corporation of Delaware No Drawing. Application September 13, 1954
Serial No. 455,740

18 Claims. (Cl. 71—2.3)

This invention relates to herbicidal compounds and methods for their use. More particularly, this invention relates to methods of inhibiting the growth of grasses in the presence of other vegetation.

Many chemical compounds are known to be deleterious to the growth of vegetation and to have herbicidal effects under specific conditions, some of which are known to be quite effective at low levels of application. It is, however, a more difficult problem to provide useful herbicides for selective activity on undesirable plants, but which are otherwise harmless to other vegetation. Compounds of this type are known, being primarily useful in eliminating broad leaf plants from grasses or grass-like cereal crops. This herbicidal activity is frequently related to the leaf area exposed to the herbicide, the plants with larger leaf areas being more susceptible to the contact herbicides.

It is the primary purpose of this invention to provide a new and useful class of general herbicides and methods for their use. A further purpose of the invention is to provide methods of destroying grasses in the presence of broad leaf plants. Still further purposes of the invention will be apparent from the following disclosure.

In accordance with this invention, it has been discovered that compounds of the following chemical structure have unusual and valuable herbicidal activities

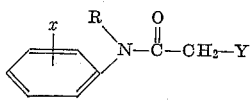

wherein Y is a halogen atom including chlorine, bromine, iodine and fluorine, wherein R is a radical selected from the group of alkyl radicals having up to six carbon atoms, the alkenyl radicals having up to six carbon atoms, the alkynyl radicals having up to six carbon atoms, the haloalkyl radicals having up to six carbon atoms, the haloalkenyl radicals having up to six carbon atoms, the haloalkynyl radicals having up to six carbon atoms, the oxaalkyl radicals having up to six carbon atoms, and wherein $x$ is selected from the group consisting of a hydrogen atom, the halogen atoms, a nitro radical, and the alkyl radicals having up to four carbon atoms.

Suitable compounds for use in the practice of this invention are those wherein the R group is selected from the group of radicals consisting of methyl, ethyl, propyl, isopropyl, n-butyl, primary isobutyl, secondary isobutyl, tertiarybutyl, n-amyl, the branch chain amyls, the hexyl radicals, vinyl, allyl, crotyl, methallyl, methylvinyl radicals, propargyl, 2-chloroethyl, 2-chloropropyl, 3-chloropropyl, chloromethyl, the 2-bromopropyl radicals, 2-chloroallyl, 3-chloroallyl, 2,3-dichloropropyl, 3-chloro-2-butenyl, chloropropargyl, 2-methoxyethyl, 2-ethoxyethyl, 2-ethoxyethoxyethyl, the methoxybutyl radicals, 3-methoxy propyl, 3-ethoxy propyl, 3-isobutoxy propyl, 4-n-propyl and n-propoxy propyl.

The above defined α-haloacetamides having both aliphatic and aromatic nitrogen substituents may in general be prepared by reacting the acid chloride of α-haloacetic acid with an excess of a nitrogen-substituted aniline, the ring of said aniline may, if desired, contain halogen, alkyl (having up to 4 carbon atoms) and nitro radicals. The herbicidal compounds are made from the secondary amines by selecting amines with the desired configuration. If the reagents are liquids, the preparation will merely involve mixing the said reagents under refrigerated conditions so as to prevent an excessive rate of reaction. It is frequently advantageous to conduct the reaction in the presence of a stoichiometric amount of caustic soda, and it is often desirable to conduct the reaction in the presence of a suitable solvent, for example ethylene dichloride. The N-substituted α-haloacetamides, otherwise known as the N-substituted acetanilides, may be separated from the reaction mixture and from the incident impurities by distillation, or by fractional crystallization from the solvent medium or from other suitable solvents in the case that the desired product is a solid substance. Further details in the preparation of these compounds are set forth in the following examples.

EXAMPLE I

A 500 ml. reaction flask was charged with 16.7 g. N-2-chloroallyl aniline, 24 g. of 20% sodium hydroxide solution and 100 ml. of ethylene dichloride. The mixture was cooled to −10° C. and while maintaining this temperature, 13.6 g. of chloroacetyl chloride was gradually added over a ten minute period. When the combination of reagents was complete, the mixture was allowed to warm gradually to 10° C. The organic layer which separated from the aqueous phase was washed successively with dilute hydrochloric acid, dilute sodium bicarbonate and finally with water. After drying with magnesium sulfate, the ethylene dichloride was evaporated at reduced pressure. The resulting liquid product which was fractionally distilled and the substituent boiled at 138° C. at 0.7 mm. total pressure, was identified as N-2-chloroallyl-α-chloroacetanilide.

EXAMPLE II

A reaction flask was charged with 21.4 g. of N-methyl-aniline, 48 g. of 20% sodium hydroxide solution and 100 ml. of ethylene dichloride. The flask and its contents was cooled to −10° C. and 27 g. of chloroacetyl chloride gradually added over a period of 15 minutes. After stirring until the mixture was warmed to 5° C., the resulting organic phase was separated and washed with dilute hydrochloric acid and water. Upon the evaporation of the ethylene dichloride a solid product was obtained, which was recrystallized from aqueous ethanol. The white crystalline product having a melting point of 67–68.5° C. was identified as N-methyl-α-chloroacetanilide.

EXAMPLE III

Using the procedure of Example II except that the N-methyl aniline was replaced by N-butyl aniline, a product resulted which was identified as N-butyl-α-chloroacetanilide.

EXAMPLE IV

The procedure of Example II was repeated except that N-ethyl-4-chloroaniline was used in place of the N-methyl aniline. The resulting product was identified as N-ethyl-p,α-dichloroacetanilide chloroacetanilide.

The relative value of each of the N-alkyl-chloroanilides was determined by planting in greenhouse flats seeds of eight different plants each representing a principal botanical type. The flats were treated with the various herbicides at the rate equivalent to 5 lbs. per acre. In the following tables of herbicidal evaluation data, these plants are represented by letters as follows:

A _____ Wild oat
B _____ Cheat grass
C _____ Rye
D _____ Buckwheat
E _____ Mustard
F _____ Beet
G _____ Cotton
H _____ Cucumber The relative value of each compound with respect to its herbicidal effect on the various plants is indicated by a number as follows:

| | |
|---|---|
| 0 | No phytotoxicity |
| 1 | Slight phytotoxicity |
| 2 | Moderate phytotoxicity |
| 3 | Severe phytotoxicity |

*Table*

| | A | B | C | D | E | F | G | H |
|---|---|---|---|---|---|---|---|---|
| α-chloroacetanilide (control) | 0 | 2 | 0 | 0 | 0 | 2 | 0 | 0 |
| N-ethyl-α-chloroacetanilide | 2 | 3 | 1 | 0 | 0 | 2 | 0 | 2 |
| N-2-chloroallyl-α-chloroacetanilide | 1 | 3 | 1 | 1 | 0 | 1 | 0 | 1 |
| p, α- dichloro acetanilide (control) | 0 | 0 | 0 | 0 | 0 | 0 | 0 | 0 |
| N-ethyl-p, α-dichloro acetanilide | 1 | 3 | 3 | 0 | 0 | 1 | 0 | 0 |

When the N-aliphatic substituted acetanilides are used in heavier rates of application, they are quite effective over a broader range of botanical groups and at such levels the specificity with respect to grasses is less evident. The following data demonstrates this general herbicidal utility at a 25 lb. per acre level of application.

| | A | B | C | D | E | F | G | H |
|---|---|---|---|---|---|---|---|---|
| N-ethyl-α-chloroacetanilide | 2 | 3 | 3 | 0 | 1 | 3 | 0 | 3 |
| N-methyl-α-chloroacetanilide | 3 | 3 | 3 | 3 | 3 | 3 | 0 | 3 |
| N-butyl-α-chloroacetanilide | 3 | 3 | 3 | 1 | 3 | 3 | 0 | 1 |
| N-ethyl-p, α-dichloroacetanilide | 3 | 3 | 3 | 1 | 2 | 3 | 0 | 1 |
| N-2-chloroallyl-α-chloroacetanilide | 3 | 3 | 3 | 1 | 1 | 3 | 0 | 1 |

To demonstrate the lack of herbicidal effect of homologous compounds which do not have the structure, p-α-dichloroacetanilide was studied at 50 lbs. per acre. The following herbicidal effects were observed.

| | A | B | C | D | E | F | G | H |
|---|---|---|---|---|---|---|---|---|
| p-α-dichloroacetanilide | 0 | 0 | ---- | 0 | 0 | 0 | 2 | 2 |

In addition to the above data demonstrating critical characteristics of effective α-haloacetanilides, over 200 different α-haloamides have been studied to determine the effects of substituents on the alpha carbon atom and other substituents on the amide nitrogen atom. Since analogous propionamides and butyramides are not effective, it is apparent that the lack of a carbon substituent (as in the acetamide) is critical. Since compounds with two and three halogen atoms on the α-carbon atom are not herbicidal, it appears that a single α halogen atom is necessary. At the same time it was established that bromine and iodine analogues had substantially equivalent pre-emergence value and even higher contact herbicidal activity. These screening procedures indicated that the second substituent must be a relatively short chain aliphatic radical.

Valuable herbicidal effects will be observed by application of small amounts, for example as low as 1 lb. of active component per acre as well as high concentrations, for example 100 lbs. per acre. The selective activity on grasses is exhibited at lower rates of application, for example from 2 to 15 lbs. per acre. For general application and herbicidal effect on both the grasses and the dicotyledonous plants, it will be found necessary to use from 10 to 50 lbs. per acre.

Selective herbicidal activity with respect to several genera of grasses is illustrated by the data in the above tables. Other experiments run with respect to plants of different genera, which have different metabolisms and physical characteristics indicate little or no inhibition of growth. The three botanical types, or genera, of grasses which are effectively controlled by means of the α-haloacetamide of this invention, embrace a large number of undesirable plants, or weeds, frequently found in vegetable crops. This invention is not limited to removing grasses from broad leaf plants, since the selective activity will be useful in removing weeds from corn, which belongs to a different genus of grass. Many other crops and particularly the broad leaved plants are inhibited by weeds of the wild oat, cheat and rye genera, which can be effectively controlled by the practice of this invention. In some instances there are minor herbicidal effects on dicotyledonous plants, and therefore optimum results may depend to some extent on experience with respect to the activity of the particular N-substituted α-haloacetamide on the vegetable crop to be treated.

As demonstrated above, unusual grass specificity can be achieved at lower levels of application, whereas at higher levels of application the N-substituted α-haloacetamides exhibit a more general herbicidal effect. This provides another and quite different utility in the removal of plants of a large number or all botanical genera. It will be apparent that quite different effects can be obtained by modifying the method of use. For this reason an essential part of this invention is the formulation so as to permit a uniform predetermined application of herbicide to the plant environment, for example the leaves or soil surfaces, so as to produce the desired effect. By the proper selection and proportioning of the various conditioning agents either liquid or solid formulations can be prepared, and so as to adapt the herbicide for achieving the desired result with any conventional device for treating plant or soil surfaces.

The solid formulations, frequently referred to as "dusts" may contain in addition to the active ingredient, diluents or extenders, dispersing agent to prevent local high concentrations, and agents to facilitate distribution in soil or soil waters. Suitable solid diluents are those which render the compositions permanently dry and free flowing. Thus hygroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight, of the entire formulation as applied to plant or soil. More concentrated herbicides will require dilution by the user in order to properly condition the soil for the most effective usage. The concentrated solid herbicidal formulations can be used with less danger if it is mixed with the surface soil by means of a disk-plow or harrow at the time of application.

The liquid compositions for herbicidal use may be solutions, or other liquid dispersions. The choice of a liquid medium will depend to some extent upon the physical properties of the active ingredient. The N-substituted α-haloacetamides may be water-soluble and mere dissolution will then provide a usable formulation. Often the N-substituted α-haloacetamides are only limitedly soluble in water and therefore aqueous formulations will necessarily be dispersions of minute drops of the water-insoluble substances in suspension in an aqueous medium. The known water-insoluble substituted α-haloacetamides of this invention may first be dissolved in a suitable organic solvent and the organic solution of the active ingredient then incorporated in water or in any aqueous medium to produce a heterogenous dispersion of the active ingredient in water.

One composition which aids in the effectivity of the herbicidal component is a surface active agent which serves in providing uniform dispersions of all formulation components of both solid and liquid types, and may be anionic, cationic or non-ionic types and includes conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil or plant surfaces being treated. For this purpose readily flowable compositions are required, either liquid or solid in physical state. Thus a critical aspect of the invention is the fluent carrier without which the optimum herbicidal effects cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed destroying properties. The described conditioning agents enable the proper use to achieve the desired herbicidal effects by an unskilled operator without elaborate equipment.

What is claimed is:

1. A method of inhibiting the germination of seeds and the growth of plants which comprises treating the plant environment with a compound having the structural formula

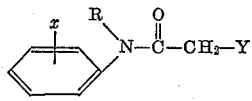

wherein Y is a halogen atom, wherein R is a radical selected from the group of alkyl radicals having up to six carbon atoms, the alkenyl radicals having up to six carbon atoms, the alkynyl radicals having up to six carbon atoms, the halo-alkyl radicals having up to six carbon atoms, the halo-alkenyl radicals having up to six carbon atoms, and the halo-alkynyl radicals having up to six carbon atoms; and wherein x is selected from the group consisting of a hydrogen atom, the halogen atoms, a nitro radical, and the alkyl radicals having up to four carbon atoms, said compound being added in an amount and concentration sufficient to inhibit the seed germination and growth.

2. A method of inhibiting the germination of seeds and the growth of plants which comprises treating the plant environment with N-methyl α-chloroacetanilide, in an amount and concentration sufficient to inhibit the seed germination and growth.

3. A method of inhibiting the germination of seeds and the growth of plants which comprises treating the plant environment with N-ethyl α-chloroacetanilide, in an amount and concentration sufficient to inhibit the seed germination and growth.

4. A method of inhibiting the germination of seeds and the growth of plants which comprises treating the plant environment with N-butyl α-chloroacetanilide, in an amount and concentration sufficient to inhibit the seed germination and growth.

5. A method of inhibiting the germination of seeds and the growth of plants which comprises treating the plant environment with N-2-chloroallyl α-chloroacetanilide, in an amount and concentration sufficient to inhibit the seed germination and growth.

6. A method of inhibiting the germination of seeds and the growth of plants which comprises treating the plant environment with N-ethyl-p-α-dichloroacetanilide, in an amount and concentration sufficient to inhibit the seed germination and growth.

7. A composition for inhibiting the germination of seeds and the growth of plants which comprises a herbicide conditioning agent and in an amount sufficient to exert a herbicidal action a compound of the structure

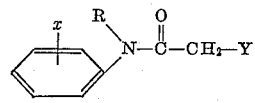

wherein Y is a halogen atom, wherein R is a radical selected from the group of alkyl radicals having up to six carbon atoms, the alkenyl radicals having up to six carbon atoms, the alkynyl radicals having up to six carbon atoms, the halo-alkyl radicals having up to six carbon atoms, the halo-alkenyl radicals having up to six carbon atoms, and the halo-alkynyl radicals having up to six carbon atoms; and wherein x is selected from the group consisting of a hydrogen atom, the halogen atoms, a nitro radical, and the alkyl radicals having up to four carbon atoms.

8. The composition defined by claim 7 wherein the compound is N-methyl α-chloroacetanilide.

9. The composition defined by claim 7 wherein the compound is N-ethyl α-chloroacetanilide.

10. The composition defined by claim 7 wherein the compound is N-butyl α-chloroacetanilide.

11. The composition defined by claim 7 wherein the compound is N-2-chloroallyl α-chloroacetanilide.

12. The composition defined by claim 7 wherein the compound is n-ethyl-p-α-dichloroacetanilide.

13. A composition for inhibiting the growth of grass in the presence of crop plants, which comprises a surface active agent and in an amount sufficient to exert herbicidal action a compound of the structure

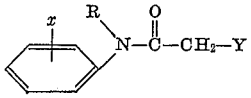

wherein Y is a halogen atom, wherein R is a radical selected from the group of alkyl radicals having up to six carbon atoms, the alkenyl radicals having up to six carbon atoms, the alkynyl radicals having up to six carbon atoms, the halo-alkyl radicals having up to six carbon atoms, the halo-alkenyl radicals having up to six carbon atoms, and the halo-alkynyl radicals having up to six carbon atoms; and wherein x is selected from the group consisting of a hydrogen atom, the halogen atoms, a nitro radical, and the alkyl-radicals having up to four carbon atoms.

14. The composition defined by claim 13 wherein the compound is N-methyl α-chloroacetanilide.

15. The composition defined by claim 13 wherein the compound is N-ethyl α-chloroacetanilide.

16. The composition defined by claim 13 wherein the compound is N-butyl α-chloroacetanilide.

17. The composition defined by claim 13 wherein the compound is N-2-chloroallyl α-chloroacetanilide.

18. The composition defined by claim 13 wherein the compound is N-ethyl-p-α-dichloroacetanilide.

References Cited in the file of this patent

UNITED STATES PATENTS

| 2,622,976 | Hitchcock et al. | Dec. 23, 1952 |
| 2,636,816 | Stewart | Apr. 28, 1953 |
| 2,649,363 | Swezey | Aug. 18, 1953 |